(12) United States Patent
Addanki et al.

(10) Patent No.: US 10,519,842 B2
(45) Date of Patent: Dec. 31, 2019

(54) EXHAUST SENSOR MODULE SHIELD

(71) Applicant: Ford Global Technologies, LLC, Dearborn, MI (US)

(72) Inventors: Neelima Addanki, Dearborn Heights, MI (US); Bryan Pepper, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 533 days.

(21) Appl. No.: 15/156,792

(22) Filed: May 17, 2016

(65) Prior Publication Data
US 2017/0335743 A1 Nov. 23, 2017

(51) Int. Cl.
*F01N 13/00* (2010.01)
*G01M 15/10* (2006.01)

(52) U.S. Cl.
CPC ......... *F01N 13/008* (2013.01); *G01M 15/102* (2013.01); *F01N 2260/20* (2013.01); *F01N 2450/18* (2013.01)

(58) Field of Classification Search
None
See application file for complete search history.

(56) References Cited

U.S. PATENT DOCUMENTS

| | | | | |
|---|---|---|---|---|
| 3,897,979 A | * | 8/1975 | Vangalis ................. | B60Q 1/44 188/112 R |
| 4,159,441 A | * | 6/1979 | Livingston .............. | H01T 13/05 123/169 PH |
| 5,382,752 A | * | 1/1995 | Reyhan ................... | H02G 3/088 174/38 |
| D378,511 S | * | 3/1997 | Austin ..................... | D13/162 |
| 5,700,068 A | * | 12/1997 | Austin ..................... | B60T 7/20 303/24.1 |
| 6,670,549 B1 | | 12/2003 | Wohlfahrt et al. | |
| 6,867,968 B2 | * | 3/2005 | Katsuro .................. | H05K 7/20854 361/600 |
| 7,120,024 B2 | * | 10/2006 | Watanabe ............... | H05K 7/20854 361/704 |
| 7,192,463 B2 | * | 3/2007 | Shutty .................... | F01N 13/008 174/50 |
| 8,549,938 B2 | * | 10/2013 | De Lorenzo ........... | G01D 11/24 73/40.5 A |

(Continued)

FOREIGN PATENT DOCUMENTS

DE 102006032999 A1 1/2008
DE 102007060625 A1 6/2009

OTHER PUBLICATIONS

"Sensor Assy Part# 5L239." Ford, Mar. 17, 2014, parts.ford.com/shop/en/us/sensor-assy-7808701-1.*

(Continued)

*Primary Examiner* — Peter J Macchiarolo
*Assistant Examiner* — Alexander A Mercado
(74) *Attorney, Agent, or Firm* — Brooks Kushman P.C.; Geoffrey Brumbaugh

(57) ABSTRACT

An exhaust sensor module assembly has a sensor module and a shield. The shield is shaped to receive the module. The shield has a first mounting leg and a first flange extending from a first end of a base plate, and a second mounting leg and a second flange extending from a second end of the base plate. The shield is rotationally symmetric about an axis extending through and normal to the base plate.

20 Claims, 3 Drawing Sheets

(56) References Cited

U.S. PATENT DOCUMENTS

| | | | | |
|---|---|---|---|---|
| 9,105,175 | B1* | 8/2015 | Cantolino | F24H 9/16 |
| 9,217,355 | B2* | 12/2015 | Boahene | F01N 13/008 |
| 2003/0226412 | A1* | 12/2003 | Rumminger | F01N 13/008 |
| | | | | 73/866.5 |
| 2007/0278829 | A1 | 12/2007 | Bell et al. | |
| 2008/0100528 | A1* | 5/2008 | Noro | H01Q 1/3291 |
| | | | | 343/872 |
| 2010/0103632 | A1* | 4/2010 | Kato | H05K 5/006 |
| | | | | 361/752 |
| 2012/0060599 | A1* | 3/2012 | Morino | G01F 1/6842 |
| | | | | 73/204.11 |
| 2012/0262182 | A1* | 10/2012 | Matsuoka | G01N 15/0656 |
| | | | | 324/464 |
| 2015/0217606 | A1* | 8/2015 | Peng | B60C 23/0496 |
| | | | | 73/146.8 |
| 2016/0128208 | A1* | 5/2016 | Bolik | H05K 5/0069 |
| | | | | 361/709 |
| 2017/0010137 | A1* | 1/2017 | Kitagawa | G01D 11/30 |

OTHER PUBLICATIONS

Granowicz et al., "New Polymer 'Shield' Technology Protects High-Performance Nylon and PPA Polymers to Replace More Metal—For Weight and Cost Savings—Under the Hood", SAE International, Apr. 12, 2011, 10 pages.

* cited by examiner

EXHAUST SENSOR MODULE SHIELD

TECHNICAL FIELD

Various embodiments relate to a shield or a cover for an exhaust gas sensor module on a vehicle.

BACKGROUND

Various sensor assemblies are provided in a vehicle exhaust system with a sensor measuring a state of the exhaust gases in communication with a sensor module. The sensor module is often mounted on the vehicle frame near the exhaust, and may be exposed to the surrounding environment and road debris, experience heating from the adjacent exhaust system, as well as incur rattle or noise, vibration, and harshness based on the connection to the frame that may impact the life of the sensor module as well as impact user expectations for vehicle noise.

SUMMARY

In an embodiment, a shield for an exhaust sensor module is provided with a base plate having first and second opposed sides, a first flange extending outwardly from the first side, and a second flange extending outwardly from the second side. The shield has a first mounting leg extending outwardly from the first side and a second mounting leg extending outwardly from the second side. The shield is rotationally symmetric about an axis extending through and normal to the base plate.

In another embodiment, an exhaust sensor module assembly is provided with a sensor module and a shield. The shield is shaped to receive the module. The shield has a first mounting leg and a first flange extending from a first side of a base plate, and a second mounting leg and a second flange extending from a second side of the base plate. The shield is rotationally symmetric about an axis extending through and normal to the base plate.

In yet another embodiment, a shield for an exhaust gas sensor module has a member with a base portion with first and second opposed ends. A first flange and a first mounting leg extend from the first end. A second flange and a second mounting leg extend from the second end. The member is twofold rotationally symmetric about an axis extending through and normal to the base portion.

DETAILED DESCRIPTION

As required, detailed embodiments of the present disclosure are provided herein; however, it is to be understood that the disclosed embodiments are merely exemplary of the and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
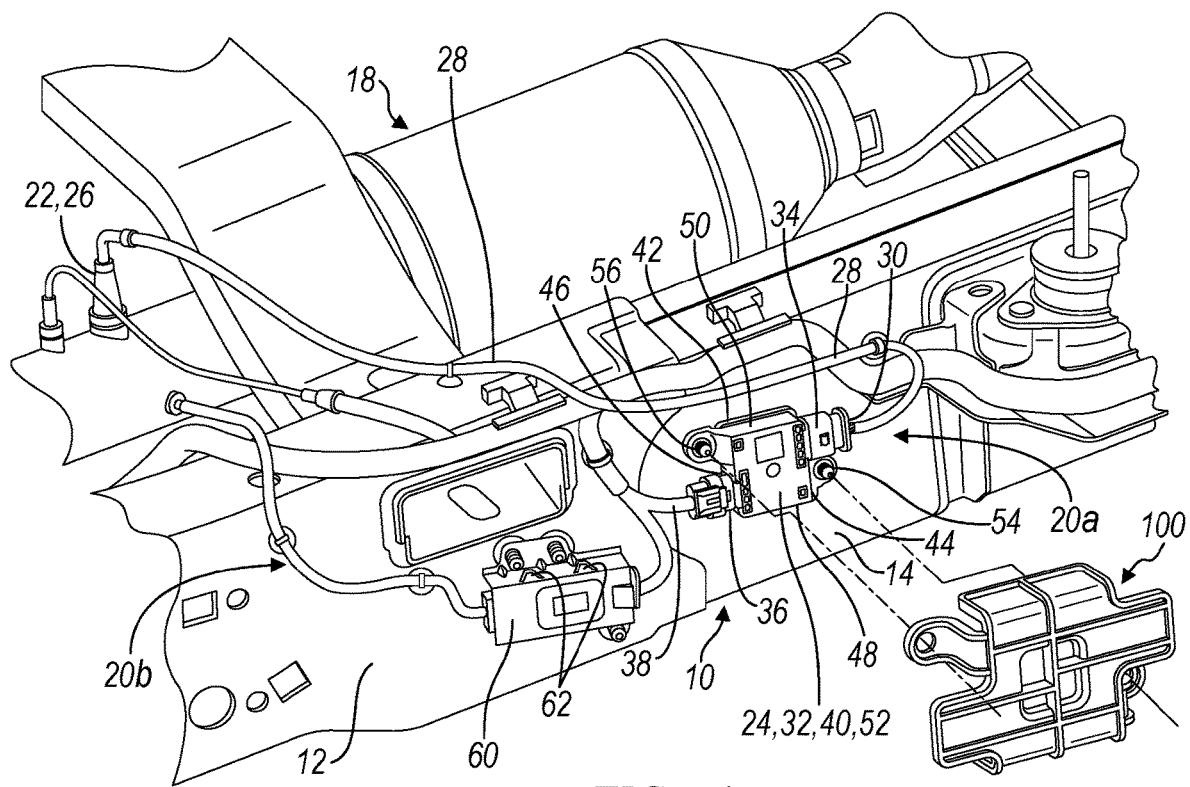
FIG. 1 illustrates a schematic of a vehicle configured to implement the disclosed embodiments.

FIG. 1 illustrates a partial schematic view of a portion of a vehicle 10. The vehicle 10 may be an automobile such as a passenger car, truck, or the like, or may be another ground or air transportation vehicle.

The vehicle 10 has a frame 12. The frame 12 provides structural support for the vehicle and supports various vehicle sub-assemblies, such as powertrain and drivetrain, suspension and wheels, etc. The frame 12 may be of a unibody type according to one non-limiting example. The frame 12 has at least one panel 14 or frame member.

The vehicle 10 has an engine (not shown) and associated exhaust system 18. The engine may be a spark ignition engine or a compression ignition engine. The engine may be the sole prime mover in the vehicle, or may be used with another prime mover, such as an electric motor, with the vehicle configured as a hybrid vehicle. The exhaust system 18 provides a pathway for exhaust gases from the engine to the surrounding environment. The exhaust system 18 may include various emissions control devices and sound reduction devices. Emission control devices or systems include: a catalytic converter, a particulate matter sensor, and the like. The sound reduction device may be provided by one or more mufflers.

Various sensor assemblies 20 may be provided with the exhaust system. Each sensor assembly 20 may sense or detect a state of the exhaust gas or a state of an exhaust gas system 18 at the location of the sensor, including temperature, pressure, gas or chemical concentrations, e.g. as an oxygen sensor, or the like. In the example shown, a NOx sensor assembly 20*b* and a particulate matter sensor assembly 20*a* are illustrated. Each sensor assembly 20 has a sensor 22 that connects to an associated sensor module 24. The sensor 22 has a sensing element 26 that is connected to a cable 28 and an electrical connector 30. The sensor module 24 has a housing 32 that contains various electronics and sensor controls. The housing 32 supports a first electrical connector 34 that mates or connects with the electrical connector 30 32 of the sensor. The housing 32 also supports a second electrical connector 36 that mates or connects with a wiring harness 38. The wiring harness 38 may provide electrical power to the sensor module 24 and also provides for communication between the sensor module 24 and assembly 20 and a control unit (not shown) for the vehicle, such as an engine control unit, exhaust system control unit, vehicle system controller, or the like. In one example, the harness 38 is a power and fuel tank control system harness for the vehicle.

In one example, the sensor housing 32 has a first housing portion 40 and a second housing portion 42. The first and second housing portions 40, 42 are connected together. The first housing portion 40 may have one open side or face and define a cavity to receive various electronics for the sensor module 24. The second housing portion 42 may be a plate that is welded to the first housing portion 40 to enclose the cavity. In other examples, the first and second housing portions 40, 42 may be otherwise shaped to provide the overall sensor housing 32 as shown, and the portions 40, 42 may be connected to one another using another joining or fastening process. The housing 32 has a first side wall 44 and a second opposed side wall 46. The first side wall 44 supports the first electrical connector 34, and the second side wall 46 supports the second electrical connector 36 for the sensor module 24. The housing 32 also has third and fourth side walls 48, 50 connected to the first and second side walls 44, 46 to generally define the perimeter of the housing 32 and surround a top plate 52.

The first housing portion 40 has first and second mounting flanges 54, 56 extending outwardly therefrom, with each mounting flange 54, 56 having an aperture therethrough. In other examples, the second housing portion 42 may be provided with the mounting flanges 54, 56. Fasteners may be used to connect the sensor module 24 to the vehicle frame 12. Conventionally, a shield 60 may be provided to cover the sensor module, and may be formed from a metal material. This conventional shield 60 is commonly designed to snap onto and about the housing of the sensor module such that the sensor module is connected to and supported by the shield 60, which in turn is connected to and supported by the vehicle frame 12, e.g., using fasteners such as a bolt and nut. Therefore, the sensor module is not directly connected to the frame 12, and is only directly connected to the shield 60. As shown in FIG. 1, the shield 60 may be provided with features 62 for the friction or snap fit of the shield to the housing of a sensor module. The conventional shield 60 is therefore retained by friction and the snap fit onto the sensor module housing. This shield 60 may provide an added load and stress on the welded connection of the housing of the sensor module, as well as having only one orientation for connecting to the housing. Additionally, as the conventional shield 60 is formed from a metal material, the sensor module assembly and shield 60 may result in various noise vibration and harshness (NVH) issues, rattle, resonating, and the like, especially as one of the two elements, sensor module or shield, is not directly connected to the vehicle frame 12.

FIGS. 2-5 illustrate a shield 100 according to the present disclosure. The shield 100 is also illustrated in FIG. 1 as being separated from the sensor module 24. The shield 100 may be integrally formed as a single member, as shown in the Figures. In one example, the shield 100 is formed from a nylon or a plastic material in a molding process, such as injection molding. In a further example, the shield 100 is formed from a thermoplastic or thermoset material, or from a nylon or polyamide material, including Polyamide 66 (PA66) with or without a specified fraction of fiberglass.

The shield 100 has a base plate 102 with first and second opposed sides 104, 106 or first and second opposed ends or edges 104, 106. The first and second opposed sides 104, 106 form or are along a portion of the perimeter of the base plate 102. The base plate 102 has an outer surface 108 and an opposed inner surface to face the sensor module 24.

The shield 100 has a first flange 110 extending outwardly from the first side 104. The shield has a second flange 112 extending outwardly from the second side 106. The second flange 112 may be the same size and shape as the first flange 110. The first and second flanges 110, 112 may be coplanar with the base plate 102 as shown. In other examples, the first and second flanges 110, 112 may be parallel to and offset from the base plate 102, or oriented at an angle between zero and ninety degrees relative to the base plate 102. The first and second flanges 110, 112 extend over the electrical connectors 30, 34, 36, such that each electrical connector is positioned between the vehicle frame 12 and the respective flange 110, 112 for protection from the environment.

The shield 100 has a first mounting leg 120 or mounting member extending outwardly from the first side 104. The shield 100 also has a second mounting leg 122 or mounting member extending outwardly from the second side 106. The second mounting leg 122 may be the same shape and size as the first mounting leg 120. Each mounting leg 120, 122 has a first portion 124 connecting a second portion 126 to the base plate 102. The first portion 124 is oriented at an angle relative to the base plate 102 and the second portion 126, and in one example, the angle is ninety degrees such that the first portion 124 extends perpendicular relative to the base plate 102 and to the second portion 126. The second portion 126 defines an aperture 128 therethrough. The aperture 128 of each mounting leg 120, 122 is positioned to be in register with the aperture of the mounting flange 54, 56 of the sensor module 24 when the shield 100 is positioned about the sensor module 24, such that the apertures are aligned with one another for insertion of fasteners therethrough. The second portion 126 may be generally parallel with the base plate 102. The base plate 102 has a surface such as the upper surface 108 connecting the first and second opposed sides 104, 106, with at least a portion of the planar surface lying in a first plane. The second portion 126 of each mounting leg 120, 122 lies in a second plane that is parallel with the first plane. The second portion 126 of each mounting leg 120, 122 is formed to mate and cooperate with a surface of the mounting flange 54, 56 of the sensor module.

Figure 5:
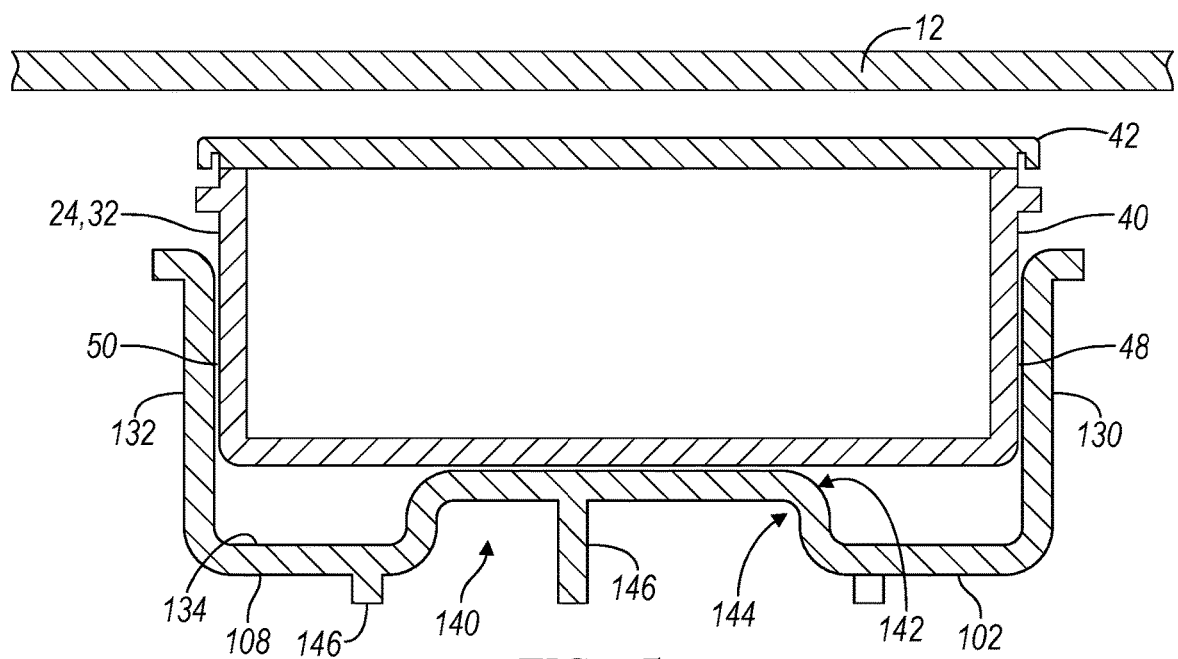
FIG. 5 illustrates a cross section view of the shield and sensor module assembly of FIG. 2.

The shield 100 has first and second opposed side walls 130, 132 extending from the base plate 102. The side walls 130, 132 and the base plate 102 may cooperate to form a U-shaped cross-section for the shield 100 as shown in FIG. 5. Each side wall 130, 132 extends at an angle relative to the base plate 102, and in one example, are perpendicular to the base plate 102. Each side wall 130, 132 extends between the first and second sides 104, 106 of the base plate and generally covers the third and fourth side walls 48, 50 of the sensor module, respectively.

In other examples, the shield 100 may have side walls 130, 132 extending from and at least partially along the ends 104, 106 of the base plate 102, with the mounting legs 120, 122 extending from the base plate 102 and over the third and fourth side walls 48, 50 of the sensor module. The shield 100 may also have the mounting legs 120, 122, flanges 110, 112, and side walls 130, 132 positioned differently on the base plate 102 to correspond with another sensor module electrical connector and mounting flange configuration, while maintaining the rotational symmetry.

The shield 100 forms a cavity or recess sized to receive the exhaust gas sensor module 24 to protect the module 24. The cavity is generally defined by the inner surface 134 of the base plate, the first and second side walls 130, 132, and the first and second mounting legs 120, 122.

The base plate 102 may have a central region 140 that forms a protrusion 142 on the inner surface 134, and may form a corresponding recess 144 in the outer surface 108 of the base plate 102. The protrusion 142 extends towards the sensor module 24 and towards the second portions 126 of the mounting legs. The protrusion 142 may be in contact with or within a small clearance, e.g. on the order of millimeters, of the sensor module 24 when the shield 100 is connected to the sensor module to further reduce any noise vibration, or harshness (NVH), and to reduce rattle. In one example, the protrusion 142 surface, the side walls 130, 132, and/or the first portions 124 of the mounting legs are in a close fit with the housing of the sensor module.

The shield 100 and base plate 102 may have various ribs 146. The ribs 146 provide additional strength and structure for the shield 100. In one example, the shield 100 has a generally uniform thickness, from which the ribs 146 extend.

The shield 100 is rotationally symmetric or radially symmetric about an axis 150 extending through and normal to the base plate 102. The shield 100 is twofold rotationally symmetric about the axis 150, as can be seen by the positioning of the flanges 110, 112 and mounting legs 120, 122 on the first and second sides 104, 106. In other words, the shield 100 has rotational symmetry when rotated 180 degrees, or twofold, about the axis 150. As the shield 100 is twofold rotationally symmetric, the shield 100 may be correctly or properly installed in either of the two orientations with either the aperture of the first mounting leg 120 or the aperture of the second mounting leg 122 aligned with the aperture of the same mounting flange, e.g. flange 54, of the sensor housing. As the shield 100 is rotationally symmetric, it can be installed correctly in either of the two possible orientations.

Fasteners 160 are used to connect the shield 100 and the sensor module 24 to the vehicle frame 12. The apertures of the mounting legs 120, 122 of the shield, the apertures of the mounting flanges 54, 56 of the sensor module are aligned with and positioned to be in register with corresponding apertures in the vehicle frame 12. Each fastener 160 extends through a corresponding mounting leg, mounting flange, and the frame. For example, one fastener 160 extends through the apertures of the mounting leg 120, mounting flange 54, and the frame 12, while the other fastener 160 extends through the apertures of the mounting leg 122, mounting flange 56, and the frame 12. Therefore, each of the shield 100 and the sensor module 24 are connected to the frame via the fasteners 160, as the fasteners 160 pass through each element.

The fasteners 160 may be a push in clip, also known as a pine tree fastener or retainer, push in retainer, push rivet, panel trim retainer, or double sided push pin. The fasteners 160 may be made from a nylon or plastic material. The fasteners 160 have fins or barbed protrusions that run down a length of the fastener from a head of the fasteners towards a point or the opposed end of the fastener. The fasteners 160 therefore have an insertion force that is lower than a pullout or removal force. Additionally, the fastener 160 may be a one-time-use fastener. To connect the shield 100 and sensor module 24 to the frame 12, the fasteners 160 are aligned with the apertures of the shield, module, and frame, and pushed through the apertures until the head of the fastener 160 reaches the second portion 126 of the mounting leg. As the fastener 160 is a push in clip, there is not a corresponding nut or other portion of the fastener.

As the shield 100 is formed from a plastic or nylon material, the shield 100 has a reduced weight compared to a conventional shield 60. The reduced weight or mass, the direct connection of the shield and sensor module 24 to the frame 12, along with the fins of the push in fastener 160 resisting movement of components along the length of the fastener, acts to reduce NVH and rattle. This also reduces vibrations on the welded joint connecting the two housing portions 40, 42 of the sensor module 24, as well as reducing vibrational loads on the electrical components within the sensor module, such as capacitors. The plastic or nylon structure of the shield 100 also does not resonate compared to a metal shield 60. Additionally, the twofold rotational symmetry of the shield 100 and use of push in fasteners 160 provides for ease of assembly of the shield 100 to the sensor module 24 and vehicle frame 12.

The shield 100 has a base plate 102, side walls 130, 132, and flanges 110, 112 that generally surrounds and protects the sensor module 24 from the surrounding environment, for example, to prevent road debris such as dirt, gravel or salt from impacting the sensor module directly. The shield 100 provides a thermal barrier to reduce heating of the sensor module 24 by heat from the exhaust system.

In other examples, the inner and/or outer surface of the shield 100 may additionally be provided with one or more coatings. For example, the inner surface of the shield 100 may be provided with a rubber, foam, or other coating to further reduce NVH of the sensor module 24 and shield 100 assembly. The outer surface of the shield 100 may be provided with a thermal barrier coating or reflective coating to further reduce heating of the sensor module 24.

Figure 2:
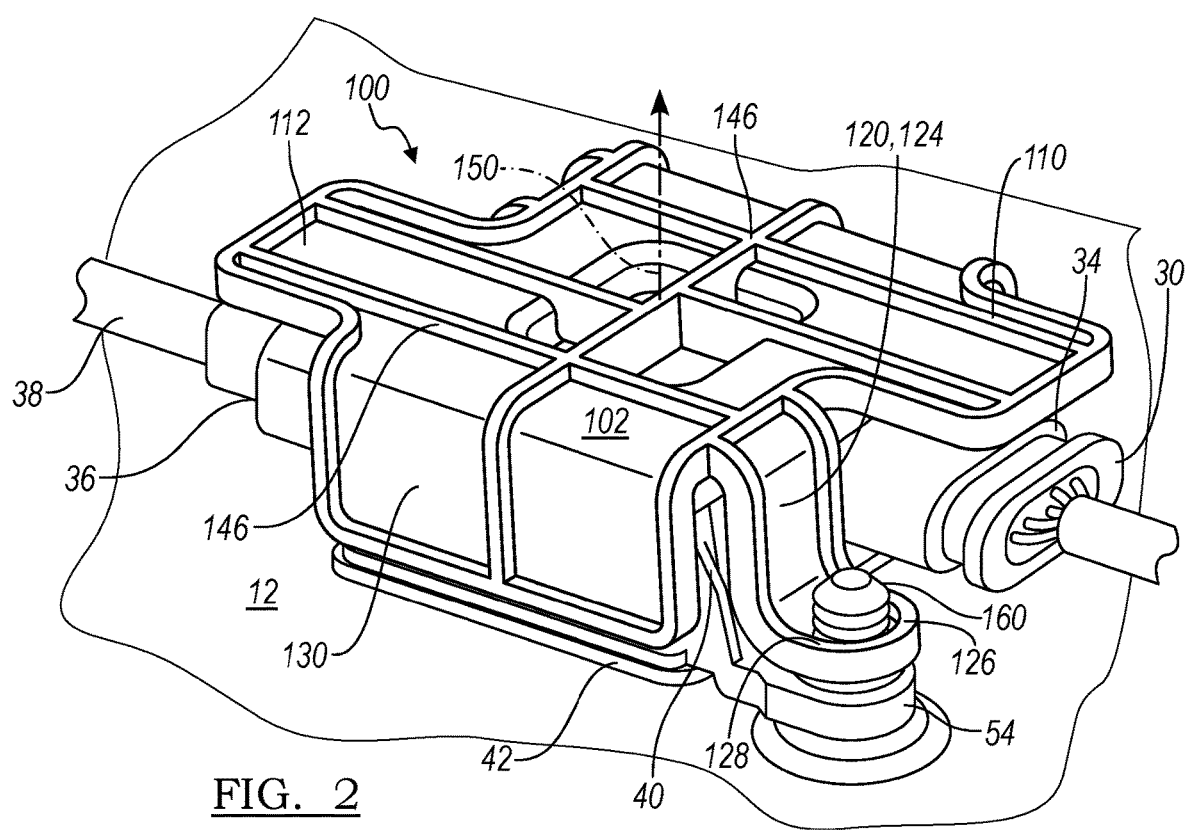
FIG. 2 illustrates a perspective view of a shield and sensor module assembly according to an embodiment.
Figure 3:
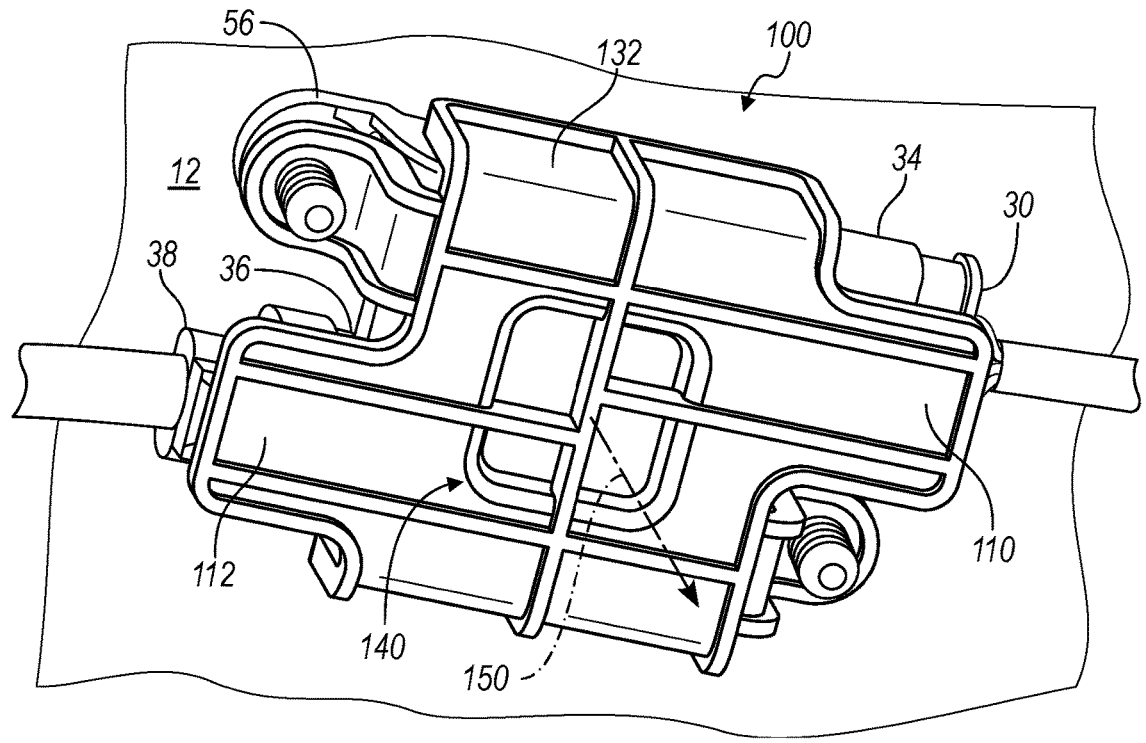
FIG. 3 illustrates another perspective view of the shield and sensor module assembly of FIG. 2.
Figure 4:
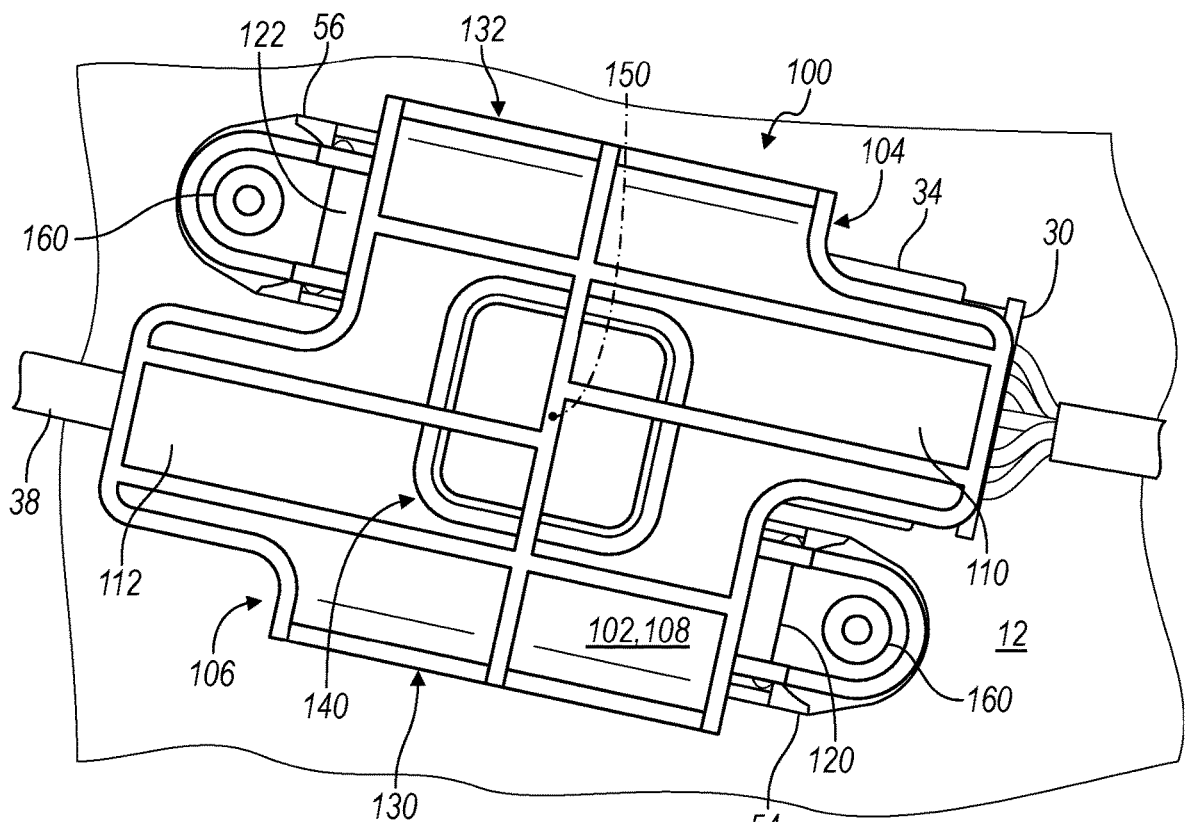
FIG. 4 illustrates a yet another perspective view of the shield and sensor module assembly of FIG. 2.
Figure 6:
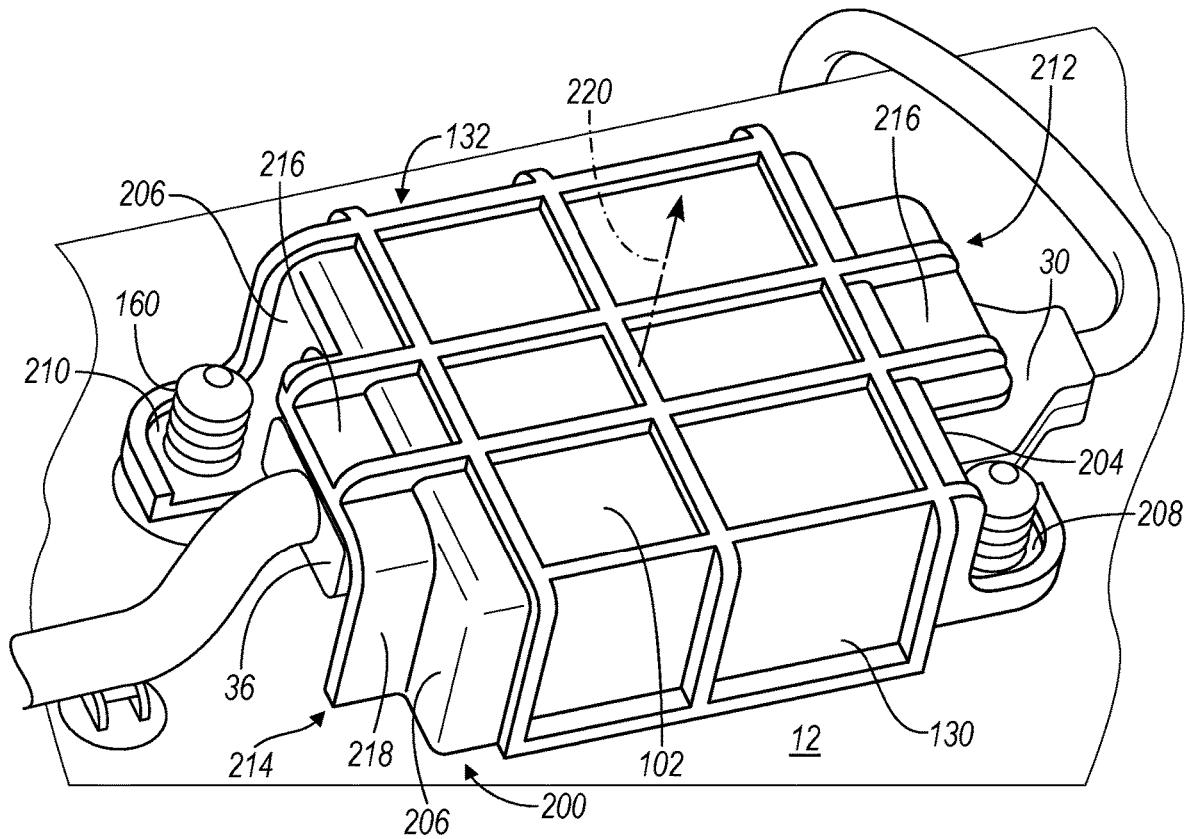
FIG. 6 illustrates a perspective view of a shield and sensor module assembly according to another embodiment.

FIG. 6 illustrates a variation of the shield 200 shown in FIG. 2. Elements of the shield 200 that are the same as or similar to those of the shield 100 as shown in FIGS. 1-5 are given the same reference numbers.

The shield 200 has sides 204, 206 that extend outwardly from the base plate 102 and along the sides of the sensor housing 32. The sides 204, 206 are similar to the first portion 124 of the mounting legs 120, 122 of the shield 100; however, the sides 204, 206 are connected to both the base plate 102 and a corresponding side wall 130, 132.

The shield 200 has mounting legs 208, 210 that extend outwardly from the sides 204, 206. The mounting legs 208, 210 each have an aperture sized to receive a fastener 160. The mounting legs 208, 210 are similar to the second portion 126 of the mounting legs 120, 122 of the shield 100. The mounting legs 208, 210 are parallel with the base plate 102 of the shield 200.

The shield 200 has flanges 212, 214 to cover the respective electrical connections 30, 36. The flanges 212, 214 may provide additional coverage and protection of the respective electrical connections. Each flange 212, 214 has a first portion 216 and a second portion 218. The first portion 216 is connected to the base plate 102, and may be generally coplanar with the base plate 102 or offset and parallel to base plate 102 as shown. The second portion 218 is connected to the base plate 102 by the first portion 216. The second portion 218 may also be connected to a respective side wall of the shield 200, such as side wall 206 as shown. The second portion 218 may be at an angle relative to, e.g. perpendicular to, the first portion 216, the base plate 102, and the side wall 206. The second portion 218 may be offset from and generally parallel to a corresponding adjacent side wall, such as wall 130.

The shield 200 has twofold rotational symmetry about an axis 220, such that the shield 200 may be connected to the sensor module 24 and the frame 12 in two different orientations.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A shield for an exhaust sensor module comprising:
   a base plate having first and second opposed ends;
   first and second opposed side walls extending from the base plate, each side wall extending between the first and second ends of the base plate;
   a first flange extending outwardly from the first end and co-planar with the base plate;
   a second flange extending outwardly from the second end and co-planar with the base plate;

a first mounting leg extending outwardly from the first end; and a second mounting leg extending outwardly from the second end;

wherein the shield is rotationally symmetric about an axis extending through and normal to the base plate.

2. The shield of claim 1 wherein the shield is twofold rotationally symmetric about the axis.

3. The shield of claim 1 wherein each of the first and second mounting legs have a first portion connecting a second portion to the base plate, the second portion defining an aperture therethrough.

4. The shield of claim 3 wherein the base plate has a surface connecting the first and second opposed ends, at least a portion of the surface, the first flange, and the second flange lying in a first plane; and wherein the second portion of each of the first and second mounting legs lies in a second plane that is parallel with the first plane.

5. The shield of claim 4 wherein a central region of the surface of the base plate forms a recess extending towards the second plane and having a planar surface for contact with the sensor module.

6. The shield of claim 5, wherein the first portion of the first mounting leg and the first portion of the second mounting leg extend parallel to one another, and wherein the first portion of the first mounting leg and the first portion of the second mounting leg are perpendicular to the first and second side walls of the base plate.

7. The shield of claim 6 wherein the first portions of the first and second mounting legs are spaced apart from the first and second side walls, respectively, to form a gap therebetween and expose side walls of the sensor module.

8. The shield of claim 1 wherein the base plate, the first and second side walls, and the first and second mounting legs define a cavity sized to receive the sensor module.

9. The shield of claim 1 wherein each flange has a first portion connecting a second portion to the base plate, the first portion co-planar with the base plate, and the second portion positioned perpendicularly to the first portion.

10. An exhaust sensor module assembly comprising:

a sensor module with first and second opposed side walls, each side wall providing an electrical connector and a mounting flange extending outwardly and defining an aperture therethrough; and a shield shaped to receive the module, the shield having a first mounting leg and a first flange extending from a first end of a base plate, and a second mounting leg and a second flange extending from a second end of the base plate, the shield being rotationally symmetric about an axis extending through and normal to the base plate;

wherein each electrical connector of the module is covered by a respective one of the first and second flanges of the shield;

wherein each mounting leg of the shield has a first portion connecting a second portion to the base plate, the second portion defining an aperture therethrough; and wherein the apertures of the mounting legs of the shield are aligned with the apertures of the mounting flanges of the module.

11. The assembly of claim 10 wherein the second portion of each mounting leg mates with a respective one of the mounting flanges of the module.

12. The assembly of claim 10 further comprising first and second fasteners, each fastener sized to extend through the apertures of the mounting leg and the mounting flange and into a vehicle body.

13. The assembly of claim 12 wherein each fastener is a push in clip.

14. The assembly of claim 13 wherein the sensor module has a first housing portion coupled to a second housing portion.

15. The assembly of claim 14 wherein the first and second housing portions of the sensor module are welded together.

16. The assembly of claim 10 wherein the module has third and fourth opposed side walls; and wherein the shield has first and second side walls extending from the base plate to cover the third and fourth side walls of the module.

17. The assembly of claim 10 wherein the shield comprises at least one of plastic and nylon.

18. A shield for an exhaust gas sensor module comprising:

a member having a base portion with first and second opposed ends, a first flange and a first mounting leg extending from the first end, a second flange and a second mounting leg extending from the second end, the member being twofold rotationally symmetric about an axis extending through and normal to the base portion, the first and second flanges being co-planar with the base portion.

19. The shield of claim 18 wherein the base portion has first and second opposed side walls, each side wall extending from the base portion and extending between the first and second opposed ends; and wherein the base portion, the first and second opposed side walls, and the first and second mounting legs cooperate to define a cavity sized to receive the exhaust gas sensor module.

20. The shield of claim 18 wherein each mounting leg has a first end connected to the base portion and a second end defining an aperture therethrough, the aperture sized to receive a fastener to connect the shield and the exhaust gas sensor module to a vehicle frame.

* * * * *